(12) United States Patent
Wich

(10) Patent No.: US 9,982,388 B2
(45) Date of Patent: May 29, 2018

(54) FABRIC FOR A MACHINE TO PRODUCE A FIBER WEB AND METHOD OF PRODUCING A FIBER WEB

(71) Applicant: VOITH PATENT GMBH, Heidenheim (DE)

(72) Inventor: Torsten Wich, Appleton, WI (US)

(73) Assignee: Voith Patent GmbH, Heidenheim (DE)

( * ) Notice: Subject to any disclaimer, the term of this patent is extended or adjusted under 35 U.S.C. 154(b) by 211 days.

(21) Appl. No.: 14/825,350

(22) Filed: Aug. 13, 2015

(65) Prior Publication Data

US 2017/0044716 A1 Feb. 16, 2017

(51) Int. Cl.
*D21F 7/08* (2006.01)
*B32B 5/26* (2006.01)
(Continued)

(52) U.S. Cl.
CPC ............ *D21F 1/0036* (2013.01); *B32B 5/024* (2013.01); *B32B 5/26* (2013.01); *D21F 1/0054* (2013.01); *D21F 7/08* (2013.01)

(58) Field of Classification Search
CPC .... D21F 1/0027; D21F 1/0036; D21F 1/0045; D21F 1/0054; D21F 1/10; D21F 1/105; D21F 1/12; D21F 1/14; D21F 1/16; D21F 7/08; D21F 7/083; D21F 7/10; D21F 7/12; B32B 5/022; B32B 5/024; B32B 5/026; B32B 5/22; B32B 5/26; B32B 7/08
USPC ...................... 162/348, 358.2, 900, 902–904; 139/383 A, 383 AA; 442/239, 240, 241, 442/246, 247, 268, 269, 270, 271
See application file for complete search history.

(56) References Cited

U.S. PATENT DOCUMENTS 4,781,967 A * 11/1988 Legge ........................ B32B 5/12
162/900
7,892,402 B2 * 2/2011 Hawes .................. D21F 1/0036
162/348
(Continued)

FOREIGN PATENT DOCUMENTS

DE 10 2004 044 568 * 3/2006
WO WO 89/12717 * 12/1989
(Continued)

OTHER PUBLICATIONS

DE 10 2004 044 568, dated Mar. 2006, English language machine translation, European Patent Office.*

*Primary Examiner* — Eric Hug
(74) *Attorney, Agent, or Firm* — Laurence A. Greenberg; Werner H. Stemer; Ralph E. Locher

(57) ABSTRACT

A fabric for a machine to produce a fiber web, especially a paper-, board-, tissue- or pulp web, is formed of a flat woven base material having a top side and a bottom side, two terminal ends separated in a machine direction, folds formed in the flat woven base material being separated in the machine direction by the folding defining an inside between the two folded layers and an outside. The two terminal ends are located under the bottom side surface, wherein the two terminal ends one of are adjacent to each other or overlap each other, seam loops located at the folds characterized in that the fabric further has one, two or more sheet-like plies. Also a method to produce a fiber web, especially a paper-, board-, tissue- or pulp web is carried out with a machine that is provided with at least one such novel fabric.

15 Claims, 2 Drawing Sheets

(51) Int. Cl.
*D21F 1/00* (2006.01)
*B32B 5/02* (2006.01)

(56) References Cited

U.S. PATENT DOCUMENTS

| | | | |
|---|---|---|---|
| 8,043,477 B2 | 10/2011 | Crook et al. | |
| 8,353,252 B1 | 1/2013 | Klaschka et al. | |
| 2009/0211722 A1* | 8/2009 | Crook | D21F 1/0036 |
| | | | 162/358.4 |
| 2016/0069022 A1* | 3/2016 | Lee | D21F 7/10 |
| | | | 162/202 |

FOREIGN PATENT DOCUMENTS

| | | |
|---|---|---|
| WO | 2009106182 A1 | 9/2009 |
| WO | 2013083468 A1 | 6/2013 |

\* cited by examiner

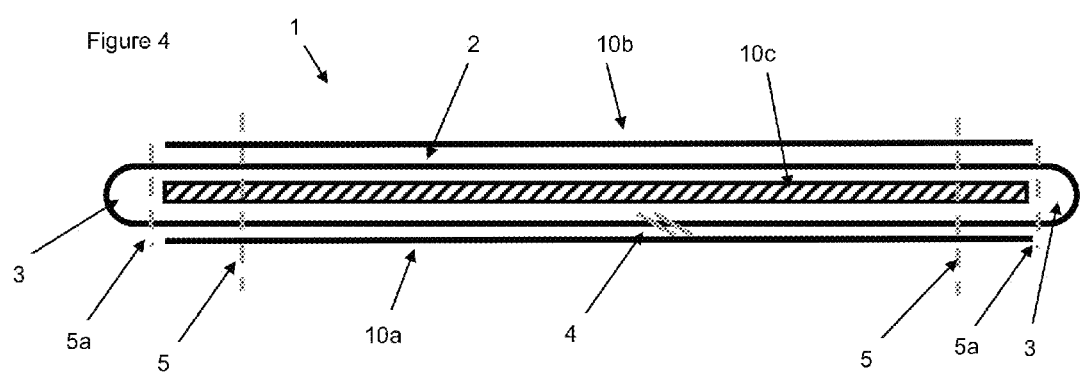

FABRIC FOR A MACHINE TO PRODUCE A FIBER WEB AND METHOD OF PRODUCING A FIBER WEB

BACKGROUND OF THE INVENTION

Field of the Invention

The present invention relates to a fabric for a machine to produce a fiber web, especially a paper-, board-, tissue- or pulp web. The fabric includes a flat woven base material having a top side and a bottom side, two terminal ends separated in a machine direction, folds formed in the flat woven base material being separated in the machine direction by the folding defining an inside between the two folded layers and an outside. The two terminal ends are located under the bottom side surface, wherein the two terminal ends are either adjacent to each other or overlap each other, seam loops located at the folds. The invention also relates to a method of producing a fiber web.

In modern paper machines, the paper web is transported on different kinds of paper machine clothing's like wires or felts through the process. In the press section of a paper machine, press felts are widely used, that comprise one or more fibrous batt layers and a base structure made from woven material.

From a user's perspective, in many applications, the void volume through the lifetime of the fabric is a critical requirement for good performance. Of special interest are seamable press felts, since they are easier to handle. Many of these applications, that require a substantial void volume for good performance—for example in board and packaging paper machines—are also sensitive to seam marks and therefore also require a seam with uniform dewatering and good structural integrity for full life performance. A base fabric design is required which provides both necessary void volume and seam design to ensure a uniform pressure profile and dewatering through life.

From an economic perspective, the fabric should be quick and easy to produce. Therefore, it is known, for example from commonly assigned U.S. Pat. No. 8,043,477 B2 and its counterpart WO 2009/106182 to use a simple, flat woven material and to fold it in order to produce a two ply base structure with seam loops for a seamable fabric. The use of a flat woven material is advantageous, since it can easily be produced on a comparably simple and cheap loom and the production time is much faster compared to an endlessly woven structure. The task of preparing a seam for such fabrics is also discussed in the literature. See, for instance, commonly assigned U.S. Pat. No. 8,353,252 B1 and its counterpart WO 2013/083468.

Unfortunately, in some important applications, the two ply designs as described in U.S. Pat. No. 8,043,477 B2 and WO 2009/106182 or in U.S. Pat. No. 8,353,252 B1 and 2013/083468 do not provide enough void volume to guarantee sufficient dewatering properties.

SUMMARY OF THE INVENTION

It is accordingly an object of the invention to provide a fabric for a web producing machine which overcomes the above-mentioned and other disadvantages of the heretofore-known devices and methods of this general type and of the present invention and which provides for a fabric for a machine to produce a fiber web, especially a paper-, board-, tissue- or pulp web, where the base structure can be easy and economically produced while providing sufficient void volume for demanding applications and an economical way to produce a fiber web.

With the foregoing and other objects in view there is provided, in accordance with the invention, a fabric for a machine for producing a fiber web, the fabric comprising:

a flat woven base material having a top side and a bottom side, two terminal ends separated from one another in a machine direction;

said flat woven base material being folded in two folded layers with folds being separated from one another in the machine direction and defining an inside between the two folded layers and an outside;

said two terminal ends being located under the bottom side surface and said two terminal ends being adjacent one another or overlapping one another, and wherein seam loops are located at said folds; and one or more sheet plies.

In other words, the fabric for a machine for producing a fiber web, especially a paper-, board-, tissue- or pulp web, comprises a flat woven base material. The base material has a top side and a bottom side, two terminal ends separated in a machine direction and folds formed in the flat woven base material being separated in the machine direction.

This folding defines an inside between the two folded layers and an outside.

The two terminal ends are located after the folding under the bottom side surface.

These two terminal ends can either be positioned adjacent to each other or overlap each other. Seam loops for the fabric are located at the two folds.

When installed in a production machine, the fabric can be seamed at these seam loops in order to generate an endless fabric.

According to this invention, the fabric further comprises at least one or more sheet-like plies.

These sheet-like plies can provide additional void volume to the fabric. In many applications, the fabric may have two sheet-like plies. If more void volume is needed, there may be implementations of the present invention including, three, four, five or more sheet-like plies.

One of the advantages of the inventive fabric is the fact, that by adding additional sheet-like plies to enlarge the void volume of the fabric, the base weave does not have to provide so much void volume. Therefore, an inexpensive, flat woven base can be used, instead of e.g. multilayer weaves.

In a preferred embodiment of the invention, the fabric may comprise two or more sheet-like plies.

Here, each of the additional sheet-like plies does only have to provide a part of the void volume, since two or more sheet-like plies are provided in the fabric. Therefore, also the material and structure of the sheet-like may be chosen for economic reasons rather that its ability to provide all the desired additional void volume.

The fabric according to the invention can be used as a press fabric, especially as a press felt. But other uses, for example as a forming fabric are also possible.

In a preferred embodiment of the invention, the sheet-like plies according to the invention have essentially the same width as the fabric. That means, that the sheet-like plies have the same width in cross machine direction as the fabric or at least not less than 90% and not more than 110% of the width in cross machine direction of the fabric.

In another preferred embodiment of the invention, the sheet-like plies according to the invention have essentially the same length as the fabric after the described folding process. That means that the sheet-like plies have the same length in machine direction as the fabric or not less than 90% and not more than 110% of the length in machine direction of the fabric.

In a very preferred embodiment of the invention, the woven base material is a one-layer weave, especially a plain weave. These materials can be fast and economically produced on modern looms.

In a preferred embodiment of the invention, one, some or all of the sheet-like plies consist of or comprise a woven material, preferably a one-layer weave, especially a plain weave.

It may be favorable, if the woven base material and one, some or all of the sheet-like plies are from the same woven material:

Using the same woven material for the woven base material and the sheet-like plies is favorable from an economical point of few, since only one type of woven material must be ordered, resulting in generally better prices from the when ordering larger quantities. Furthermore, also the production process is facilitated, since all the woven material can be taken from one large mother reel.

Another positive side effect is that in the case of a defect in the woven base, at least a portion of the material can be used as sheet-like ply, thereby reducing the waste.

In another favorable embodiment of the invention, one, some or all of the sheet-like plies consist of or comprise a nonwoven component. Such a nonwoven component may be a polymer film, a foam layer, a knitted structure or a warp-knit structure or at least comprise such a structure. These nonwoven components can also be easily produced or purchased and may be used to adapt the properties of the fabric to the actual needs.

It may also give positive effect to combine at least one woven sheet ply and at least one sheet ply with a nonwoven component.

The sheet-like plies may be positioned in the inside between the two folded layers or on the outside. Depending on the application of the fabric, it may be favorable to position all of the sheet-like plies in the inside or all of the sheet-like plies on the outside. Alternatively, at least one of the sheet-like plies may be positioned on the outside and at least one of the sheet-like plies may be positioned in the inside.

If at least one of the sheet-like plies is positioned on the outside, it may be favorable to position it in such a way, that it covers the two terminal ends. This positioning may lead to a better runability of the fabric.

If at least one of the sheet-like plies is positioned on the outside, it may also be favorable to position it in such a way, that it covers one or both of the seam loops or at least parts of them. In another preferred embodiment of the present invention, the seam loops are not covered at all by the sheet-like plies.

The fabric according to the present invention may further comprise one or more stitching. These stitchings may serve to secure the sheet plies to the flat woven base material. There may also be stitching used to secure the seam loops formed by the folded flat woven base material.

In another embodiment, the two terminal ends are at least temporarily connected to each other, especially welded to each other. This connection may or may not be destroyed during the further processing of the fabric, e.g. by needle punching or during the operation of the fabric.

In another favorable embodiment, the fabric may comprise at least on layer of batt fiber. In many applications it may even be favorable if the fabric comprises two, three or more layers of batt fibers, where the different layers of batt fibers may have different properties, e.g. different fineness of the batt fibers.

In another favorable embodiment, the fabric may be on machine seamable and comprises only one seam.

Another aspect of the present invention is a method to produce a fiber web, especially a paper-, board-, tissue- or pulp web, with a (papermaking) machine to produce the fiber web that uses at least one fabric as described.

Other features which are considered as characteristic for the invention are set forth in the appended claims.

Although the invention is illustrated and described herein as embodied in a fabric for a machine to produce a fiber web and a method to produce a fiber web, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a similar view of an alternative embodiment thereof.

DETAILED DESCRIPTION OF THE INVENTION

Figure 1:
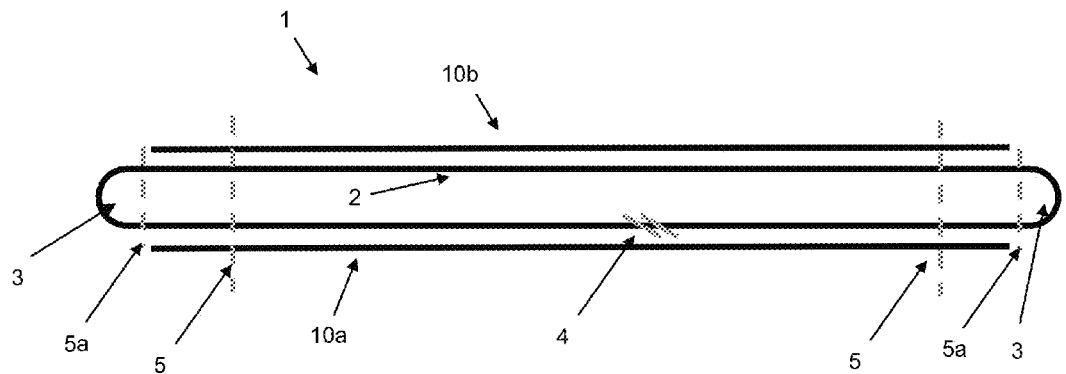
FIG. 1 is a diagrammatic side view showing a fabric according to the invention.

Referring now to the figures of the drawing in detail and first, particularly, to FIG. 1 thereof, there is shown a fabric 1 which comprises a flat woven base material 2 that is folded. Seam loops 3 are created at the folds. The two terminal ends of the flat woven base material 2 are joined together by a weldseam 4. This weldseam 4 may be permanent, holding the terminal ends together during the lifetime of the fabric 1. In another preferred embodiment, the weldseam 4 may be temporary, and it may be destroyed in a further processing step like needle punching, or may be destroyed during the operation of the fabric.

The embodiment in FIG. 1 comprises two sheet-like plies or sheet plies 10a, 10b. Both sheet plies 10a, 10b are positioned on the outside. One sheet-like ply 10a is positioned directly on top of the two terminal ends and the weldseam 4, while the other sheet-like ply 10b is positioned on the opposite side. According to the invention, it is also possible to position two sheet-like plies 10a, 10b on top of the weldseam 4, or to position two of the sheet-like plies 10a, 10b on the opposite side. The fabric 1 further comprises some stitchings 5, 5a. Some stitchings 5a are used to secure the seam loops 3. The other stitchings 5 are used to secure the sheet-like plies 10a, 10b to the flat-woven base material 2. The number of the stitchings 5, 5a may vary depending on the length of the sheet-like plies. There may be less or more stitchings 5, 5a than shown in FIG. 1. The sheet-like plies 10a, 10b shown in FIG. 1 are made from the same flat-woven material as the flat woven base material 2. This has economic advantages. Depending on the application, it may be preferable to use other materials for the sheet-like plies 10a, 10b. Even nonwoven material can be beneficial.

As seen in FIG. 1, the sheet-like plies 10a, 10b do not cover the seam loops 3. In a different embodiment it may be beneficial, however, if at least one sheet-like ply 10a, 10b or even both sheet-like plies 10a, 10b cover the seam loops 3 or at least part of the seam loops 3.

Figure 2:
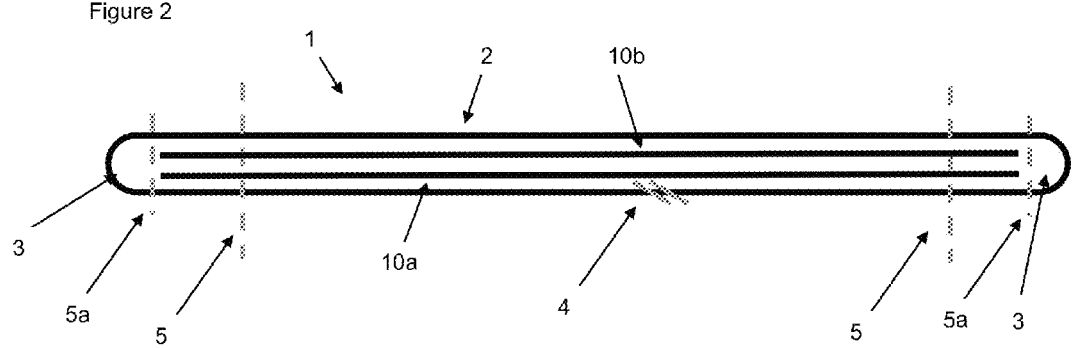
FIG. 2 is a similar view of an alternative embodiment thereof.
Figure 3:
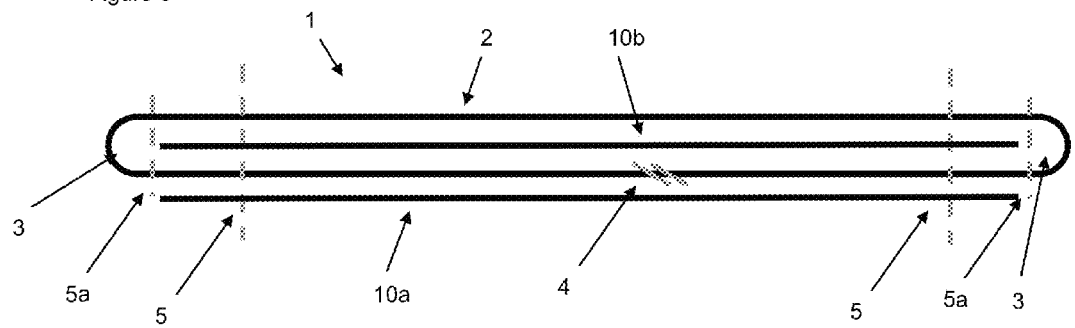
FIG. 3 is a similar view of an alternative embodiment thereof.

The embodiment shown in FIG. 2 differs from the embodiment in FIG. 1, that the two sheet-like plies 10a, 10b are both positioned in the inside of the flat woven base, while the embodiment in FIG. 3 shows a fabric 1, where one sheet-like ply 10a is positioned on the outside, while one sheet-like ply 10b is positioned in the inside. The sheet-like ply 10a on the outside covers the terminal ends and the weldseam 4 of the flat-woven base fabric 2. While this is favorable in many applications, there are also embodiments of the present invention, where a sheet-like ply is positioned on the other side.

FIG. 4 shows an embodiment of the present invention that comprises three sheet-like plies 10a, 10b, and 10c. While all possible positioning of the sheet-like plies 10a, 10b, and 10c are covered by the present invention, FIG. 4 shows as an example an embodiment of a fabric 1, where two sheet-like plies 10a, 10b are positioned on the outside, while one sheet-like ply 10c is positioned in the inside. While it is possible, that all sheet-like plies 10a, 10b, 10c are made from the same material, even from the same woven material as the flat-woven base material 2, FIG. 4 shows an embodiment, where the sheet-like ply 10c in the inside is made from a different material. In a favorable embodiment, this sheet-like ply 10c may e.g. comprise a polymer film, a foam layer, a knitted structure or a warp-knit structure.

The invention claimed is:

1. A fabric for a machine for producing a fiber web, comprising:
   a flat woven base material having a top side and a bottom side, two terminal ends separated from one another in a machine direction;
   said flat woven base material being folded in two folded layers with folds being separated from one another in the machine direction and defining an inside between the two folded layers and an outside;
   said two terminal ends being located under the bottom side surface and said two terminal ends being adjacent one another or overlapping one another, and wherein seam loops are located at said folds; and
   one or more sheet plies, wherein:
   all of said sheet plies are disposed outside said folded layers; and
   one, some or all of the sheet plies consist of or comprise a woven material or a non-woven component selected from the group consisting of a polymer film, a foam layer, a knitted structure and a warp-knit structure.

2. The fabric according to claim 1, wherein said one or more sheet plies are two or more sheet plies.

3. The fabric according to claim 1, configured for producing a fiber web selected from the group consisting of a paper web, a cardboard web, a tissue web and a pulp web.

4. The fabric according to claim 1, wherein said sheet plies have a width substantially equal to a width in cross machine direction as the fabric and/or said sheet plies have a length substantially equal to a length in the machine direction as the fabric.

5. The fabric according to claim 1, wherein said woven base material is a one-layer weave.

6. The fabric according to claim 5, wherein said woven base material is a plain weave.

7. The fabric according to claim 1, wherein said woven material is a one-layer weave.

8. The fabric according to claim 7, wherein said one-layer weave is a plain weave.

9. The fabric according to claim 1, wherein said woven base material and one, some or all of said sheet plies are formed of a same woven material.

10. The fabric according to claim 1, which comprises one or more stitchings for securing said sheet plies to said woven base material.

11. The fabric according to claim 1, wherein said two terminal ends are at least temporarily connected to one another.

12. The fabric according to claim 11, wherein said two terminal ends are connected to one another by a process selected from the group consisting of welded, stitching, and gluing.

13. The fabric according to claim 1, which further comprises at least one layer of batt fibers.

14. The fabric according to claim 1, wherein the fabric is configured to be on-machine seamable and comprises only one seam.

15. A method for producing a fiber web, providing a web-producing machine with at least one fabric according to claim 1.

* * * * *